Sept. 19, 1967                  E. BLANK                  3,343,051

LOW INDUCTANCE CAPACITOR

Filed Feb. 5, 1965                                                2 Sheets-Sheet 1

INVENTOR:
EDWARD BLANK.
BY,
Wolf, Greenfield & Hicken
ATTORNEYS

Sept. 19, 1967    E. BLANK    3,343,051
LOW INDUCTANCE CAPACITOR
Filed Feb. 5, 1965    2 Sheets-Sheet 2

INVENTOR:
EDWARD BLANK
BY,
ATTORNEYS

United States Patent Office 3,343,051
Patented Sept. 19, 1967

3,343,051
LOW INDUCTANCE CAPACITOR
Edward Blank, Sharon, Mass., assignor to Tobe Deutschmann Laboratories, Inc., Canton, Mass., a corporation of Massachusetts
Filed Feb. 5, 1965, Ser. No. 430,571
8 Claims. (Cl. 317—260)

The present invention relates to a capacitor and more particularly to an energy storage capacitor having low inductance characteristics.

There has been a continuing demand for capacitors and especially energy storage capacitors having increasingly low inductances. This demand is due in part to the need for power sources capable of generating large amounts of energy in short time intervals. These demands have been evidenced in many fields of industry and research throughout the world. In the past, in attempts to minimize inductance in capacitors, some attention has been directed to the nature of the terminals. It has been known that the terminals of power capacitors contribute heavily to the inherent inductance of the capacitor. But, insofar as can be determined, and despite considerable studies and efforts, no reduction below 60 nanohenries of the inductance of power capacitors has been attained. Capacitors having an inductance in the order of 60 nanohenries are usually foil wound capacitors in which the terminals of the foils are brought together into parallel relations at one end of the capacitor. But these terminals have been selected and arranged in a manner which contributes heavily to the inductance of the device.

The present invention is designed to overcome these problems. In the present invention there is provided a capacitor construction of comparatively inexpensive and simple design that may be used to provide capacitors with inductances of considerably less than 5 nanohenries, selectively high resonant frequencies, and storage capacities in excess of 3000 joules. Thus the present invention provides capacitor means with a sufficiently low inductance, high energy storage and high resonant frequency to permit rapid generation of substantial power with a great deal of efficiency. For purposes of this disclosure, low inductance shall mean in the order of 5 nanohenries or less; high energy storage shall mean in the order of several kilojoules or more, and high resonant frequency shall mean in the order of megacycles/sec.

In the present invention there is also provided a low inductance energy storage capacitor which can be fabricated simply and efficiently, utilizing substantially the same equipment as is conventionally used to fabricate power capacitors.

These and other objects and advantages of the present invention will be more fully understood when considered in connection with the accompanying drawing, in which:

FIG. 4 is a cross-sectional detail in enlarged form of components utilized in the present invention, taken substantially along the line 4—4 of FIG. 1; and FIG. 5 is a cross-sectional fragmentary view taken along the line 5—5 of FIG. 3.

Figure 1:
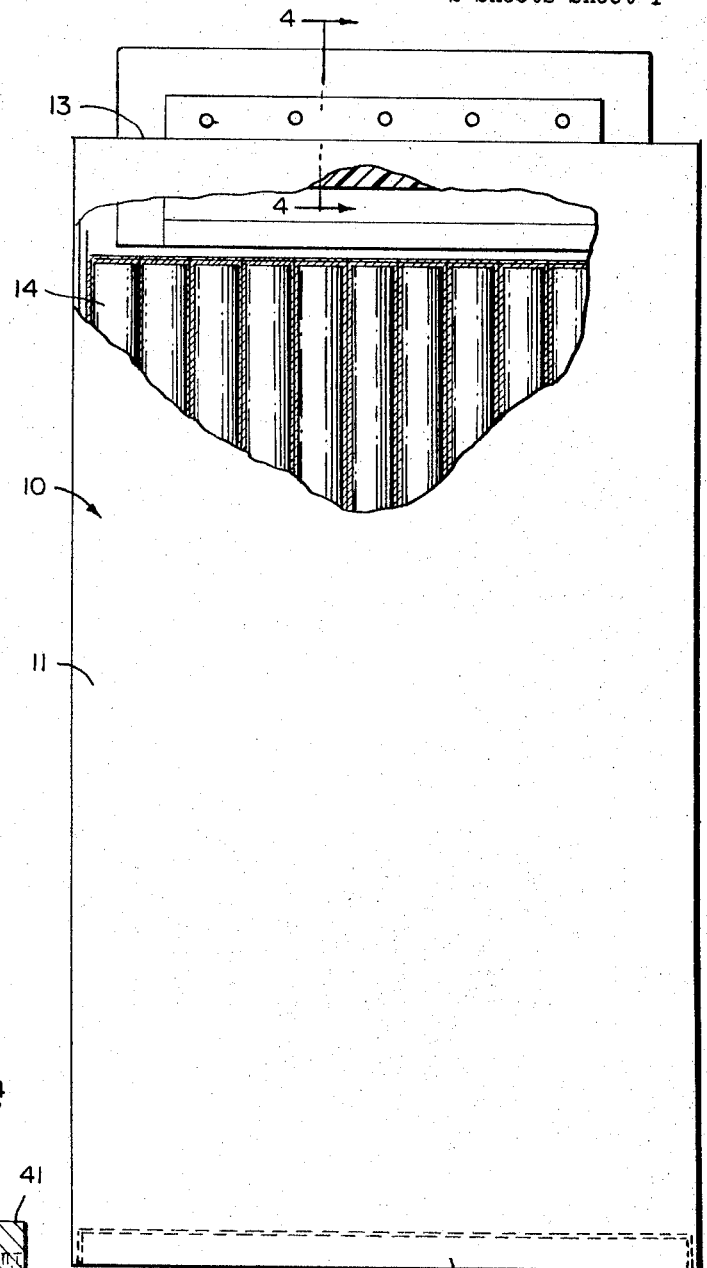
FIG. 1 is an elevational view with a portion broken away of a preferred embodiment of the present invention.

In the preferred embodiment of the invention, illustrated in the drawings, the capacitor is provided with a casing or container 10 conventionally formed with side walls 11 and a bottom 12. The top closure 13 forms a part of the low inductance terminals and will be described in greater detail subsequently. Contained within the casing 10 are a series of packs 14. The number of packs within the casing will depend in part on the inductance desired. The greater the number of packs, the lower will be the inductance. Thus, the inductance within certain limits will be reduced proportionately to the increased number of packs within a given sized casing. For purposes of illustration, however, the embodiment described is illustrated in connection with a capacitor having 12 packs and designed to have an inductance of no more than five nonohenries. A conventional capacitor of the same size would normally have an inductance of at least 60 nanohenries. Each of these packs comprises a pair of elongated conductive foils with intermediate dielectric sheets helically wound parallel to one another in a conventional manner. The foils are insulated from each other by the dielectric sheets which are preferably formed of kraft paper. One of the pair of foils in each pack has its upper portion projecting to and preferably slightly above the top of the dielectric sheets. The lower portion of this one foil is spaced inwardly from the bottom of the dielectric sheets. The other foil has its upper portions spaced inwardly from the top of the dielectric sheets and its lower portion projects to the bottom and preferably slightly below the dielectric sheets. These packs may be wound on conventional capacitor winding machines. Each pack should be formed as a flat unit having a length and width substantially greater than its thickness. The thinner the packs, the lower will be the inductance. The inductance within broad ranges will be lowered in proportion to the number of packs used in a capacitor casing of given dimensions.

After each pack has been formed by winding a pair of elongated foils with intermediate dielectric sheets, the pack is then separately wrapped with a kraft dielectric paper of equivalent dielectric strength or better than the kraft material used for the winding itself. Using a wrapper having a dielectric strength at least as good as the strength of the dielectric sheets intermediate the foils, will result in a stronger capacitor with no weak dielectric spots between packs. The dielectric wrapper 19 is initially wrapped about the sides of the pack and left open at the top and bottom. An overlap at the top and bottom is provided however, to permit the wrapper to be folded down to cover both top and bottom packs. Before the overlap at the top is folded down, the foils of each pack extending to the top 15 of the pack are conductively connected to a tab 16 of conductive material. The tab 16 has one end 17 swedged or soldered across the helix of the one foil extending to the top of the pack 15 so as to form a direct electrical connection with the projecting portions of the foil. The tab 16 extends preferably across substantially the entire thickness of the pack. A free end 18 of the tab 16 is provided for suitable connection to the terminal as hereafter described.

Figure 3:
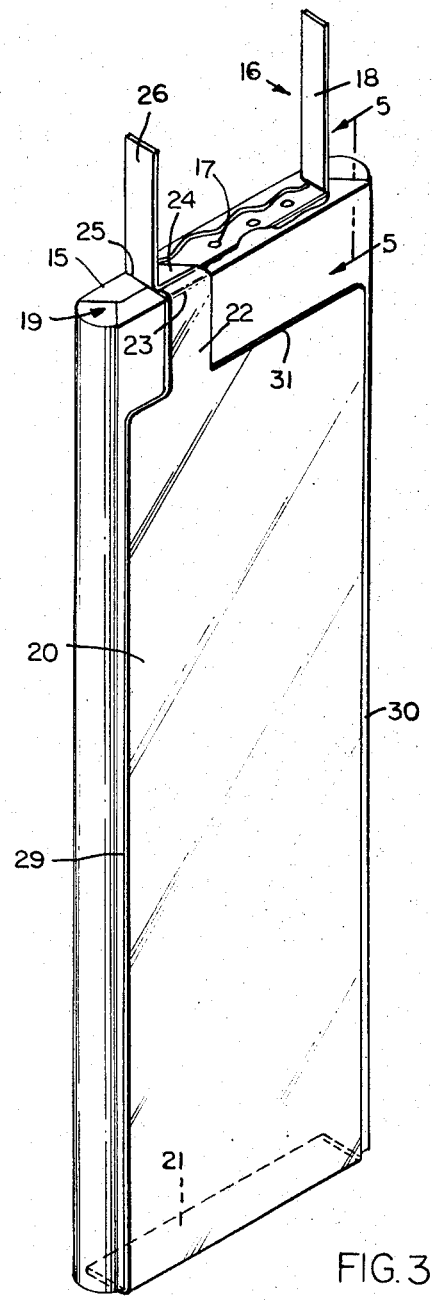
FIG. 3 is a perspective view of a partially assembled component utilized in the present invention.

The top of the wrapper 19 is folded over the end 17 of the tab 16 with the end 18 of the tab projecting from the top of the wrapper 19 as illustrated in FIG. 3. The wrapper 19 may be folded in a manner similar to a cigarette package wrapper with a slit formed in the top to permit the end 18 to project outwardly of the wrapper 19.

A conductive member 20 of suitable metal, and having a preferred thickness of between .005″ and .010″, such as plated copper, is provided for each pack. This member 20 has a main portion which is substantially the width and length of the pack. Preferably the member 20 has a width which is at least 95% of the width of the pack and a height which is approximately at least 90% of the height of the pack as is generally illustrated in FIG. 3. The height and width of member 20 should be maximized to minimized inductance, but it should not be so great as to permit voltage flashover or creepage. For this reason dimensions slightly less than the height and width dimensions of the pack are selected, preferably leaving marginal areas 29 and 30 at the sides and terminating the upper end along an edge 31, spaced downwardly from the upper edge of the pack. The lower end of the conductive member 20 is flared inwardly to form a lip 21 which is swedged or otherwise suitably electrically connected to the projecting portions of the foil that extends to the bottom of the intermediate dielectric sheets of the pack. The outer wrapper 19 is folded over the lip 21 after it has been electrically connected to the other foil of the pack so as to insulate it from the casing. The upper end of the conductive member 20 terminates in a tab 22 which starts below the upper end of the pack and extends upwardly over the top wrapper with the dielectric wrapper 19 insulating the tab 22 from the tab 16. The tab 22 is folded over the edge 23 of the pack and then subsequently folded at a 45° angle 24 and a 90° angle 25 to position the end 26 of the tab 22 in spaced parallel relation to the end 18 of the tab 16. The facing portions formed by the folds 24 and 25 of tab 22 are soldered together to form an integral continuous portion to avoid a tortuous path through which current will have to flow. The arrangement of the pack with its adjacent member 20 should be such as to minimize the space between the member 20 and the central parallel plane of the pack. To this end, the pack should be flattened as indicated.

A plurality of packs, in this embodiment 12, are formed with conductive members 20 in the manner as described. It is preferable to fabricate each pack and conductive member identical to the others in order to assure a resonant frequency that will be the same in the overall construction as the resonant frequency in the individual packs.

Figure 2:
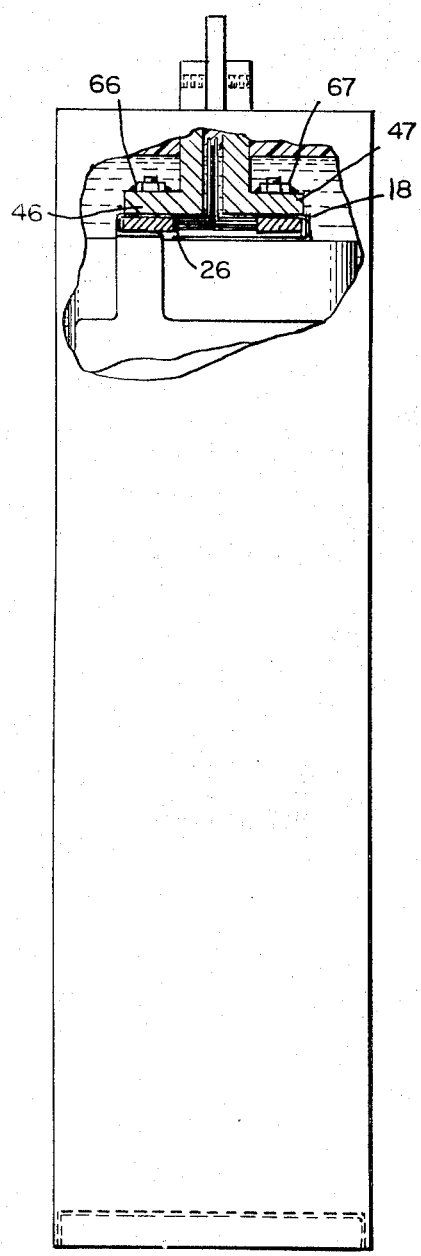
FIG. 2 is an elevational view looking from the left of FIG. 1 with a portion broken away.

These packs, which are essentially individual capacitors, with the members 20 forming a return path, are connected in parallel to a terminal, best illustrated in FIGS. 1, 2 and 4. A pair of elongated conductive terminals 40 and 41 are integrally engaged by a dielectric cover member 42. The cover member in turn is secured within and to the top of the container 10 by an annular peripheral flange 43 that integrally engages the member 42. The conductive terminal members 40 and 41 are each elongated members having an L-shaped cross section with opposite legs 44 and 45 positioned in parallel relationship to one another and with legs 46 and 47 integral respectively with legs 44 and 45 and aligned with one another. A series of preferably aligned apertures 48 are formed in legs 44 and 45. The terminal members 40 and 41 are preferably of sufficient length to extend substantially the length of the casing as illustrated in FIG. 1. These terminals 40 and 41 may be integrally formed with the dielectric member 42 and annular member 43 by casting these members in a suitable mold at one time. The dielectric member 42 is formed with a laterally extending top portion 50 having dimensions slightly less than the inner dimensions of the upper end of the casing. The annular member 43 projects outwardly from the periphery of the dielectric member 42 and is formed of conductive metal preferably of the same type as the casing 10. This annular member 43 has an L-shaped cross section with an inwardly extending leg 51 integrally formed in the top portion 50 and an upwardly extending leg 52 spaced outwardly from the top portion 50. The outer surface of leg 52 is adapted to abut the inner surface of the casing side walls at their upper ends. This leg 52 is heliarc welded or otherwise suitably and permanently secured to the side walls 11 of the casing to form a fluid-tight air-tight permanent seal thereby completely closing the interior of the casing 10.

The dielectric member 42 is provided with an intermediate tongue 54 which extends upwardly between and preferably beyond the legs 40 and 41 and spaces these two elements apart from one another. Also integrally formed and bonded with the dielectric member 42, is a plurality of sheets of kraft paper 55 which extend intermediate the legs 40 and 41. The kraft paper laminates 55 are folded under the bottom surfaces of the legs 46 and 47.

A pair of parallel bars 60 and 61 are positioned over the aligned packs, with the bars extending transversely across all the packs. These bars are positioned over the top of the wrapper 19 with the bar 60 insulated from tabs 16 and bar 61 insulated from tabs 22. The bars are each formed with a series of upstanding threaded studs or bolts 64 that in the final assembly extend through corresponding openings in legs 46 and 47, respectively. The tabs 16 attached to each pack have their ends 18 folded over and soldered to the upper and side surfaces of bar 61. The tabs 22 have their ends 26 folded over and soldered to the upper and side surfaces of the bar 60. The bars 60 and 61 are secured tightly against legs 46 and 47, respectively, with the tabs 16 and 22 held firmly between these bars. The kraft laminates 55 folded under the legs 46, and 47 extend to the sides of bars 60 and 61 as illustrated in FIG. 4.

The bars may be held in position by nuts 66 and 67 threaded onto the stud ends projecting through legs 46 and 47. In addition, these nuts may be soldered to the legs 46 and 47. This arrangement may be made by partially inserting the packs in the casing 10 after they are assembled. After this, the bars are laid across the packs and the tabs 16 and 22, as indicated. The top assembly is then positioned over the bars and the bars are secured to the legs 46 and 47. Following this, the packs are properly positioned in the casing 10. The casing is filled with oil of any conventional suitable type such as mineral oil. The oil level extends preferably to the bottom of the member 42. The oil thereby impregnates the kraft paper laminates 55 and extends between the legs 44 and 45 to form an oil reservoir above the level of the terminals or tabs 14, 16 and 22.

The arrangement illustrated is capable of providing an energy storage capacitor of, for example, 20 kilovolts with an inductance of less than 5 nanohenries. However, lower inductances can be obtained by increasing the number of packs and by making each pack of a narrower width, so that the mean distance between the conductive member 20 and the center of the packs is minimized or reducing the thickness of tongue 54 and bringing legs 44 and 45 closer together.

Having now described my invention, I claim:

1. A high energy low inductance capacitor comprising,
   a plurality of individual packs aligned side by side, said packs each comprising a pair of elongated conductive foils helically wound parallel to one another with an intermediate dielectric sheet with one foil having its upper portion projecting to the top of the dielectric sheet and its lower portion spaced inwardly from the bottom of said dielectric sheet, and with the other foil having its upper portion spaced inwardly from the top of said dielectric sheet and its lower portion projecting to the bottom of the dielectric sheet, and with said sides of said packs of substantially greater length than the thickness of said packs,
   conductive members with each lying in facing relation to and covering a major portion of a side wall of a pack, the lower end of each conductive member electrically connected to said lower portion of said foil, said conductive members each having a conductive tab extending upwardly therefrom and extending over the top of said pack in insulated relation to said one foil,
   a second conductive tab positioned above each pack, insulated from said other foil and said first tab, and having a portion thereof electrically connected to said one foil, and
   a pair of conductive terminal members, with one terminal member electrically connecting all of said first tabs and said second terminal member electrically connecting all of said second tabs.

2. A capacitor as set forth in claim 1 wherein said packs are arranged with their sides parallel to each other, and said terminal members each comprise elongated members that extend across the tops of said packs in a direction normal to said sides.

3. A capacitor as set forth in claim 2 wherein said tabs have end portions normal to said sides.

4. A capacitor as set forth in claim 3 wherein said terminal members each have legs forming L-shaped angular portions with one leg of each of said terminal members in spaced parallel relation.

5. A capacitor as set forth in claim 4 wherein each of said first tabs is connected to the other leg of one terminal member and said second tab of each pack is connected to the other leg of the other of said terminal members.

6. A capacitor as set forth in claim 5 wherein said one leg of each terminal member is formed with apertures extending therethrough,
 a dielectric member integrally formed with said terminal members and extending through said apertures.

7. A capacitor as set forth in claim 6 including a casing within which said packs are contained, and
 means integrally connecting the upper portion of said casing with said dielectric member to form a continuous seal therebetween.

8. A capacitor as set forth in claim 7 wherein said connecting means includes an annular member bonded to said dielectric material along a continuous portion and bonded along a second continuous portion to said casing.

References Cited
UNITED STATES PATENTS

| | | | |
|---|---|---|---|
| 3,024,393 | 3/1962 | Ferrante | 317—242 |
| 3,024,394 | 3/1962 | Salisbury. | |

LEWIS H. MYERS, *Primary Examiner.*

E. GOLDBERG, *Assistant Examiner.*